United States Patent
Angal et al.

(10) Patent No.: US 10,783,565 B2
(45) Date of Patent: Sep. 22, 2020

(54) METHOD, MANUFACTURE, AND SYSTEM OF TRANSFERRING AUTHENTICATED SESSIONS AND STATES BETWEEN ELECTRONIC DEVICES

(71) Applicant: eBay Inc., San Jose, CA (US)

(72) Inventors: Rajeev Angal, San Jose, CA (US); Nebojsa Pesic, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 484 days.

(21) Appl. No.: 14/528,958

(22) Filed: Oct. 30, 2014

(65) Prior Publication Data
US 2016/0125490 A1    May 5, 2016

(51) Int. Cl.
*G06Q 30/00* (2012.01)
*G06Q 30/06* (2012.01)

(52) U.S. Cl.
CPC ......... *G06Q 30/0609* (2013.01); *G06Q 30/06* (2013.01); *G06Q 30/0601* (2013.01); *G06Q 30/0603* (2013.01); *G06Q 30/0633* (2013.01); *G06Q 30/0641* (2013.01)

(58) Field of Classification Search
CPC .................. G06Q 30/0601–0645; G06Q 30/08
USPC .............................................. 705/26.1–27.2
See application file for complete search history.

(56) References Cited

U.S. PATENT DOCUMENTS 6,862,689 B2 *  3/2005  Bergsten ............. G06F 11/1471 714/15
7,730,521 B1    6/2010  Thesayi et al.

8,850,037 B2    9/2014  Mcdonough et al.
2007/0232342 A1  10/2007  Larocca
(Continued)

FOREIGN PATENT DOCUMENTS

| CN | 102571766 A | 7/2012 |
|---|---|---|
| CN | 107111591 | 8/2017 |
| WO | WO-2015069855 A1 | 5/2016 |

OTHER PUBLICATIONS

Elliott, Matt, "Find someone's Amazon Wish List by his or her e-mail address", Nov. 30, 2012, cnet, pp. 1-2; accessed at [https://www.cnet.com/how-to/find-someones-amazon-wish-list-by-his-or-her-e-mail-address/], accessed on Aug. 30, 2019 (Year: 2012).*

(Continued)

*Primary Examiner* — Jeffrey A. Smith
*Assistant Examiner* — Lindsey B Smith
(74) *Attorney, Agent, or Firm* — Shook, Hardy & Bacon LLP

(57) ABSTRACT

In various example embodiments, a system and method for transferring an authenticated session of an application running on one electronic device to a second electronic device after determining the second electronic device is a trusted device are presented. In one embodiment, an instruction is received to transfer an authenticated session of an application running on a first device associated with a user account to a second device associated with the user account. The second device is verified to be associated with the user account of the first device. The second device is determined to be a trusted device of an authorized user of the user account. The authenticated session of the application running on the first device is transferred to the second device to reproduce a current state of the authenticated session on the second device.

16 Claims, 10 Drawing Sheets

(56) References Cited

U.S. PATENT DOCUMENTS

| | | | | |
|---|---|---|---|---|
| 2011/0110275 | A1* | 5/2011 | Shaheen | H04L 65/1086 370/260 |
| 2012/0197700 | A1* | 8/2012 | Kalin | G06O 30/0222 705/14.23 |
| 2013/0041790 | A1* | 2/2013 | Murugesan | G06F 9/4856 705/30 |
| 2013/0110662 | A1* | 5/2013 | Dezelak | G06Q 30/0613 705/26.1 |
| 2013/0111047 | A1* | 5/2013 | Ghafoor | H04L 63/06 709/229 |
| 2013/0212212 | A1* | 8/2013 | Addepalli | G06F 9/461 709/217 |
| 2013/0318249 | A1* | 11/2013 | McDonough | H04L 67/02 709/228 |
| 2014/0067494 | A1 | 3/2014 | Squires | |
| 2014/0173125 | A1 | 6/2014 | Selvanandan | |
| 2014/0173686 | A1* | 6/2014 | Kgil | H04L 63/205 726/1 |
| 2014/0237250 | A1 | 8/2014 | Menezes et al. | |

OTHER PUBLICATIONS

Miller, Clair Cain and Clifford, Stephanie, Retailers Try to Adapt to Device-Hopping Shoppers, The New York Times, accessed at [https://www.nytimes.com/2012/12/22/technology/as-shoppers-hop-from-tablet-to-pc-to-phone-retailers-try-to-adapt.html] (Year: 2012).*

"International Application Serial No. PCT/US2015/057975, International Search Report dated Jan. 21, 2016", 2 pgs.

"International Application Serial No. PCT/US2015/057975, Written Opinion dated Jan. 21, 2016", 8 pgs.

"International Application Serial No. PCT/US2015/057975, International Preliminary Report on Patentability dated May 11, 2017", 10 pgs.

"European Application Serial No. 15853726.6, Response to Communication pursuant to Rules 161(2) and 162 EPC dated Jun. 19, 2017", 15 pgs.

Extended European Search Report received European Patent Application No. 15853726.6, dated Feb. 16, 2018, 9 pages.

"European Application Serial No. 15853726.6, Response filed Sep. 11, 2018 to Extended European Search Report dated Feb. 16, 2018", 18 pgs.

Communication Pursuant to Article 94(3) EPC received for European Patent Application No. 15853726.6, dated Feb. 6, 2020, 8 pages.

Response to Communication Pursuant to Article 94(3) filed on Apr. 8, 2020, for European Patent Application No. 15853726.6, dated Feb. 6, 2020, 11 pages.

Office Action received for Chinese Patent Application No. 201580071301.6, dated Mar. 23, 2020, 22 pages (11 pages of official copy and 11 pages of English translation).

Summons to Attend Oral Proceedings received for European Patent Application No. 15853726.6, dated Jun. 19, 2020, 10 Pages.

* cited by examiner

METHOD, MANUFACTURE, AND SYSTEM OF TRANSFERRING AUTHENTICATED SESSIONS AND STATES BETWEEN ELECTRONIC DEVICES

TECHNICAL FIELD

Embodiments of the present disclosure relate generally to electronic devices and, more particularly, but not by way of limitation, to a system and method for transferring authenticated sessions and states between electronic devices.

BACKGROUND

Customers expect e-commerce applications and services to be available on a variety of electronic devices such as tablets, smart phones, desktop computers, car consoles, TVs, set-top boxes, etc.

BRIEF DESCRIPTION OF THE DRAWINGS

Various ones of the appended drawings merely illustrate example embodiments of the present disclosure and cannot be considered as limiting its scope.

Figure 1A:
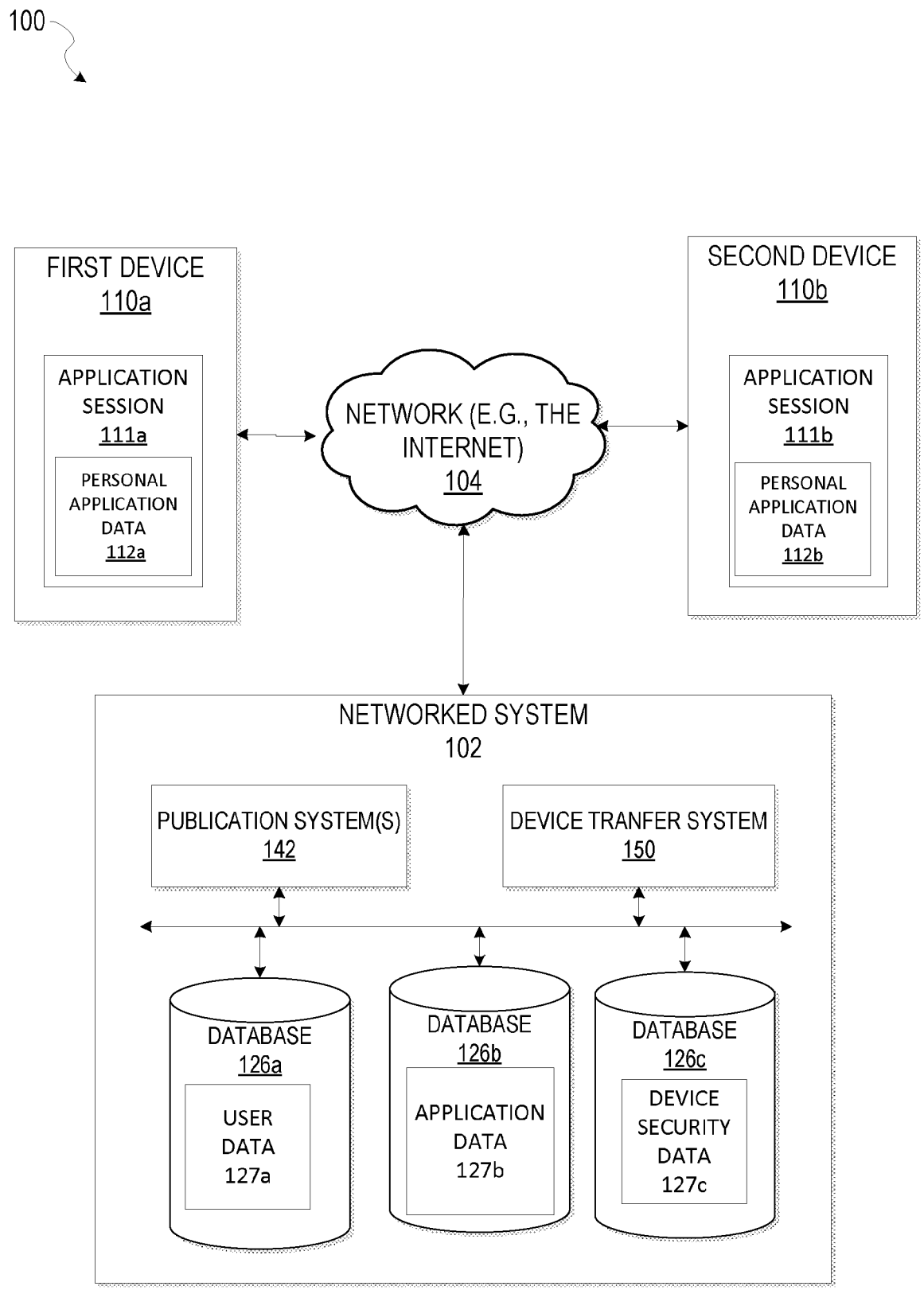
FIG. 1A is a block diagram illustrating a network architecture of a system for transferring application sessions and application data from one device to another device.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Many e-commerce companies are building applications and services on many of these platforms today. It is common for customers to use multiple devices in a single day to complete their work or various activities. However, when switching from one electronic device to another electronic device, a customer may desire to authenticate an application session on each device. Additionally, a customer may desire to transfer the activity state from one device to another device. For example, if the customer is viewing a particular item (e.g., a purse) on an online store, that particular activity state is transferred when the customer opens an authenticated session on the other device.

In various example embodiments, systems and methods to navigate between electronic devices are described. For example, customers may start some activity on a smartphone, and then continue that activity on a tablet, and later continue that activity on a car console, and then complete the activity on a desktop computer. An authenticated session on a first device is securely transferred to a second device including duplicating the current state, activity or user experience of the session on the first device. This allows the user to resume the activity on the second device that the user was engaged in on the first device prior to the transfer. Additionally, the user is not required to log into the application on the second device to create an authenticated session. Only secure sessions are transferred from the first device to the second device. A session may be considered to be secure if the system determines the second device meets certain security requirements or is deemed a trusted device before any transfers occur. The session transfer appears seamless to the user while maintaining the security of the session.

In other embodiments, the system determines whether an electronic device is a new device or returning device for an application, such as an e-commerce application. If the electronic device is a returning device (and has been registered by a user), then the system associates or assigns an identity (referred to as a device identifier (device ID) to that device. If the electronic device is a returning device, the system adds or builds a reputation associated with that returning device. The reputation of that returning device is then used to determine whether that device is a trusted device. One consideration in determining a device is a trusted is device is whether the device is in possession of an authorized user. User behavioral analysis or a variety of device criteria, characteristics, or attributes may also be used to determine whether a device is a trusted device. Once a device is trusted, it may be included in a known good list of devices according within an application. For example, good transactions on behalf of a user may be used to build a device reputation, which may be used an indicator that a device is a trusted device. Only authenticated sessions (or personal application data) may be transferred to a trusted device.

In further embodiments, consent is provided by both devices (i.e., the device transferring data and the device receiving the transferred data), before any authenticated session or personal application data may be transferred to maintain security of the session. In yet other embodiments, various levels of security states may also be transferred. For example, a family level of security allows for the transfer of personal application data from one user account associated with one electronic device to another user account of a family member associated with another electronic device. An authenticated session transfer is another example of a security level referred to as a session security level to allow a session, including the current activity state or user experience to be transferred from one electronic device to another electronic device.

FIG. 1A is a block diagram illustrating a network architecture of a system for transferring application sessions and application data from one device to another device. The system 100 includes a first device 110a, second device 110b, and a networked system 102, which may communicate with each other through the network 104. The first device 110a and the second device 110b represent client devices and are also referred to electronic devices. The first device 110a may be executing an application session 111a which may include personal application data 112a (e.g., shopping cart information). The second device 110b may be executing an application session 111b which may include personal application data 112b. The application session 111a running on the first device 110a may be transferred to the second device 110b as represented as the application session 111b, and vice versa, according to one embodiment. According to various embodiments, when transferring application sessions 111a and 111b, the current state of the application session is transferred. In other words, when the application session 111a on the first device 110a is transferred to the second device 110b, the application session 111b duplicates the application session 111a, including the state, activity or user experience of the application session 111a prior to the transfer. Personal application data 112a from the application session 111a running on the first device 110a may be transferred to the second device 110b as represented as the personal application data. 112b, and vice versa, according to another embodiment. The application session 111b or the personal application data 112b can be viewed on the second device 110b once the application session 111a or the personal application data 112a is transferred from the first device 110a. An example of personal application data 112a or 112b includes an online shopping container such as a shopping cart, wish list, saved for later list, etc.

The networked system 102 includes a publication system(s) 142 and a device transfer system 150. The publication system(s) 142 and the device transfer system 150 access data stored in databases 126a-126e, which store user data, application data, and device security data. The publication system(s) 142 may include an e-commerce application (or other application) that allows a user to transfer sessions 111a and 111b or personal application data 112a and 112b from one device (e.g., the first device 110a) to another device (e.g., the second device 110b) using the device transfer system 150. For example, the e-commerce application may be an online shopping application that may give the user the ability to create a user account associated with the user to facilitate the user's shopping at the online store. The data pertaining to the user account (also referred to as user data 127a) may be stored as one or more records in the database 126a associated with the online store. The data pertaining to the user account may include data identifying the user (e.g., the user's first and last names, phone number, billing and shipping address(es), Social Security Number (SSN), whether the user a frequent buyer, whether the user is also a vendor or a seller, etc.), transaction data (e.g., the name of a purchased product, a product identifier, the date of transaction, the price, the condition of the product, etc.), user demographic data (e.g., age, gender, financial information, family status, employment status, etc.), purchase history data, return history data, product review data, etc. The user data 127a may also include the user's log in information such as user name and password. The user data 127a, for example, the transaction data and the demographic data, may be used to build or establish the device reputation of the devices 110a and 110b.

Prior to transferring any application session 111a or 111b or personal application data 112a or 112b from one device (e.g., first device 110a) to another device (e.g., second device 110b), the device transfer system 150 determines the device (e.g., 110b) receiving the transferred application session (111a and 111b) and personal application data (112a and 112b) is an identified and trusted device. The device transfer system 150 may be integrated within one or more applications or systems from the publication system(s) 142 or may be a separate system within the networked system 102. Data that is captured from the application session 111a or the personal application data 112a may be represented by application data 127b stored in the database 126b according to an example embodiment. In other embodiments, the application data 127b may be stored locally on the first device 110a or the second device 110b. The application data 127b may include various user-selections related to the transfer of sessions 111a or 111b, personal application data 112a or 112b captured from an authenticated session and other application session data captured from an authenticated session.

The device security data 127e stored in the database 126e includes data used for determining device reputation, whether it is a known good device (KGD), or a trusted device. The device security data 127e includes data for applications (e.g., an online shopping application) such as device registration data, security level data, device list data, known good device (KGD) data, authentication data, transfer session request data, transfer personal data request data, device selection data, copy or move request data, or any other data related to particular applications included within the networked system 102.

Figure 1B:
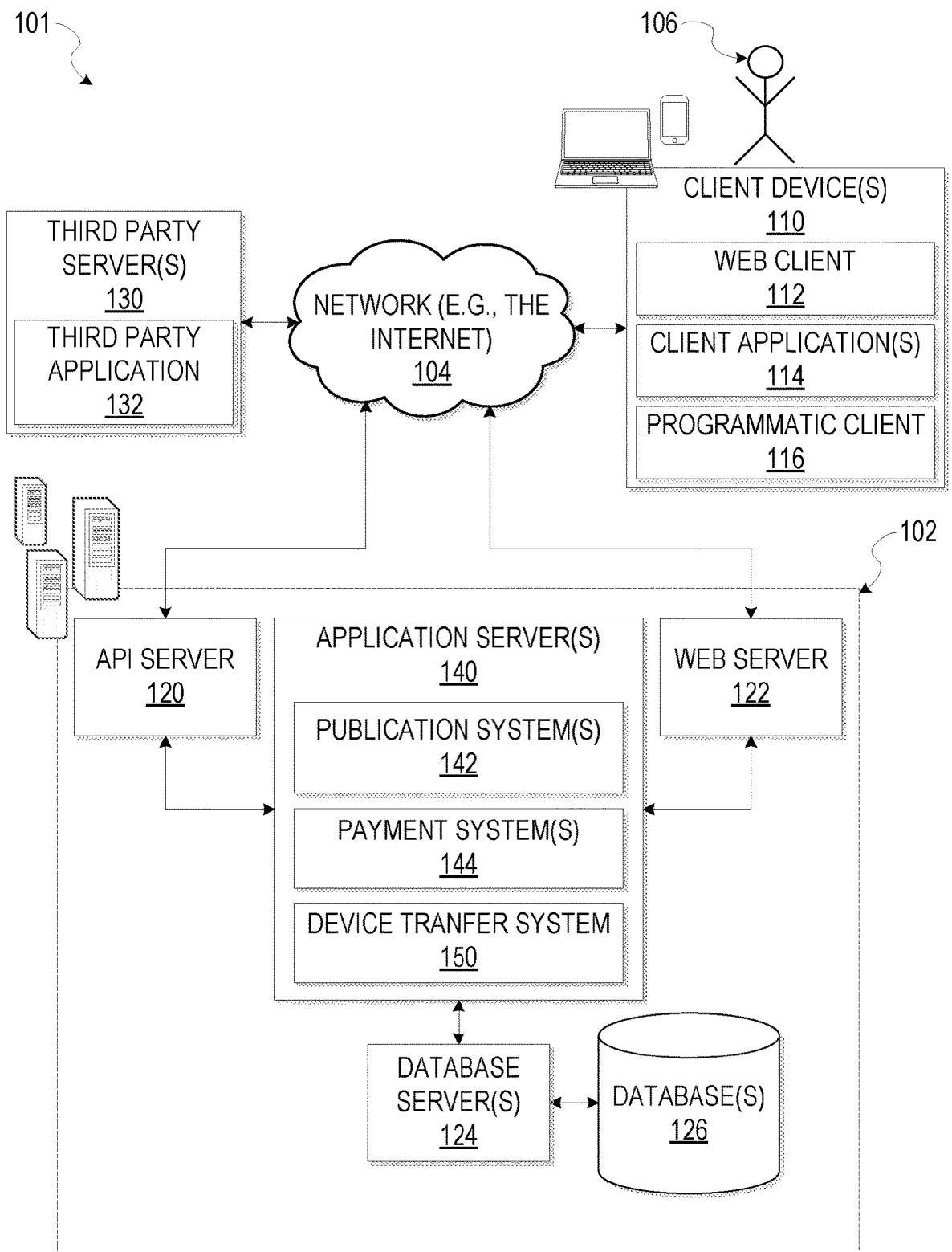
FIG. 1B is a block diagram illustrating a networked system, according to some example embodiments.

With reference to FIG. 1B, an example embodiment of a high-level client-server-based network architecture 101 is shown. A networked system 102 provides server-side functionality via a network 104 (e.g., the Internet or wide area network (WAN)) to client device(s) 110. A user (e.g., user 106) may interact with the networked system 102 using the client device 110. FIG. 1B illustrates, for example, a web client 112 (e.g., a browser, such as the Internet Explorer® browser developed by Microsoft® Corporation of Redmond, Wash. State), client application(s) 114, and a programmatic client 116 executing on the client device 110. The client device 110 may include the web client 112, the client application(s) 114, and the programmatic client 116 alone, together, or in any suitable combination. Although FIG. 1B shows one client device 110, multiple client devices 110 may be included in the network architecture 101. For example, the first device 110a and the second device 110 represent client device(s) 110.

The client device 110 may comprise a computing device that includes at least a display and communication capabilities that provide access to the networked system 102 via the network 104. The client device(s) 110 may also be referred to as electronic devices. The client device 110 may comprise, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network PC, mini-computer, and the like. In further example embodiments, the client device 110 may comprise one or more of a touch screen, accelerometer, gyroscope, biometric sensor, camera, microphone, global positioning system (GPS) device, and the like.

The client device 110 may communicate with the network 104 via a wired or wireless connection. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), cellular telephone network, a wireless network, a Wireless Fidelity (Wi-Fi®) network, a Worldwide Interoperability for Microwave Access (WiMax) network, another type of network, or a combination of two or more such networks.

The client device 110 may include one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps" or "shopping apps"), and so on. The client application(s) 114 may include various components operable to present information to the user 106 and communicate with networked system 102. In accordance with various embodiments, the client application 114 may be executing authenticated application sessions on the client device 110, such as application sessions 111a and 111b shown in FIG. 1A, and may include personal application data 112a and 112b, respectively. In some embodiments, if an e-commerce site application (or other application) is included in the client device 110, then this application may be configured to locally provide the user interface and at least some of the functionalities with the application configured to communicate with the networked system 102, on an as needed basis, for data or processing capabilities not locally available (e.g., access to a database of items available for sale, to authenticate a user 106, to verify a method of payment). Conversely, if the e-commerce site application (or other application) is not included in the client device 110, the client device 110 may use its web browser to access the e-commerce site (or a variant thereof) hosted on the networked system 102.

In various example embodiments, the users (e.g., the user 106) may be a person, a machine, or other means of interacting with the client device 110. In some example embodiments, the users 106 may not be part of the network architecture 101, but may interact with the network architecture 101 via the client device 110 or another means. For instance, the users 106 may interact with client device 110 that may be operable to receive input information from (e.g., using touch screen input or alphanumeric input) and present information to (e.g., using graphical presentation on a device display) the users 106. In this instance, the users 106 may, for example, provide input information to the client device 110 that may be communicated to the networked system 102 via the network 104. The networked system 102 may, in response to the received input information, communicate information to the client device 110 via the network 104 to be presented to the users 106. In this way, the user 106 may interact with the networked system 102 using the client device 110.

An application program interface (API) server 120 and a web server 122 may be coupled to, and provide programmatic and web interfaces respectively to, one or more application server(s) 140. The application server(s) 140 may host one or more publication system(s) 142, payment system(s) 144, and a data transfer system 150, each of which may comprise one or more modules or applications and each of which may be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital goods information in accordance with some example embodiments. In further embodiments, the database(s) 126 may represent databases 126a, 126b and 126c for storing user data 127a, application data 127b and device security data 127c, as shown in FIG. 1A.

Additionally, a third party application 132, executing on a third party server 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

The publication system(s) 142 may provide a number of publication functions and services to the users 106 that access the networked system 102. The payment system(s) 144 may likewise provide a number of functions to perform or facilitate payments and transactions. While the publication system(s) 142 and payment system(s) 144 are shown in FIG. 1B to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

The data transfer system 150 may provide functionality to transfer an authenticated session (or personalized data from the session) of an application from one electronic device to another electronic device. In other words, the session 111a on one electronic device 110a is duplicated on a second electronic device 110b. In some example embodiments, the data transfer system 150 may communicate with the client device 110, the third party server(s) 130, the publication system(s) 142 (e.g., retrieving listings), and the payment system(s) 144 (e.g., purchasing a listing). In an alternative example embodiment, the data transfer system 150 may be a part of the publication system(s) 142.

Further, while the client-server-based network architecture 101 shown in FIG. 1A employs a client-server architecture, the present inventive subject matter is, of course, not limited to such an architecture, and may equally well find application in a distributed, or peer-to-peer, architecture system, for example. The various systems of the applications server(s) 140 (e.g., the publication system(s) 142 and the payment system(s) 144) may also be implemented as standalone software programs, which do not necessarily have networking capabilities.

The web client 112 may access the various systems of the networked system 102 (e.g., the publication system(s) 142)

via the web interface supported by the web server 122. Similarly, the programmatic client 116 and client application(s) 114 may access the various services and functions provided by the networked system 102 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 1C:
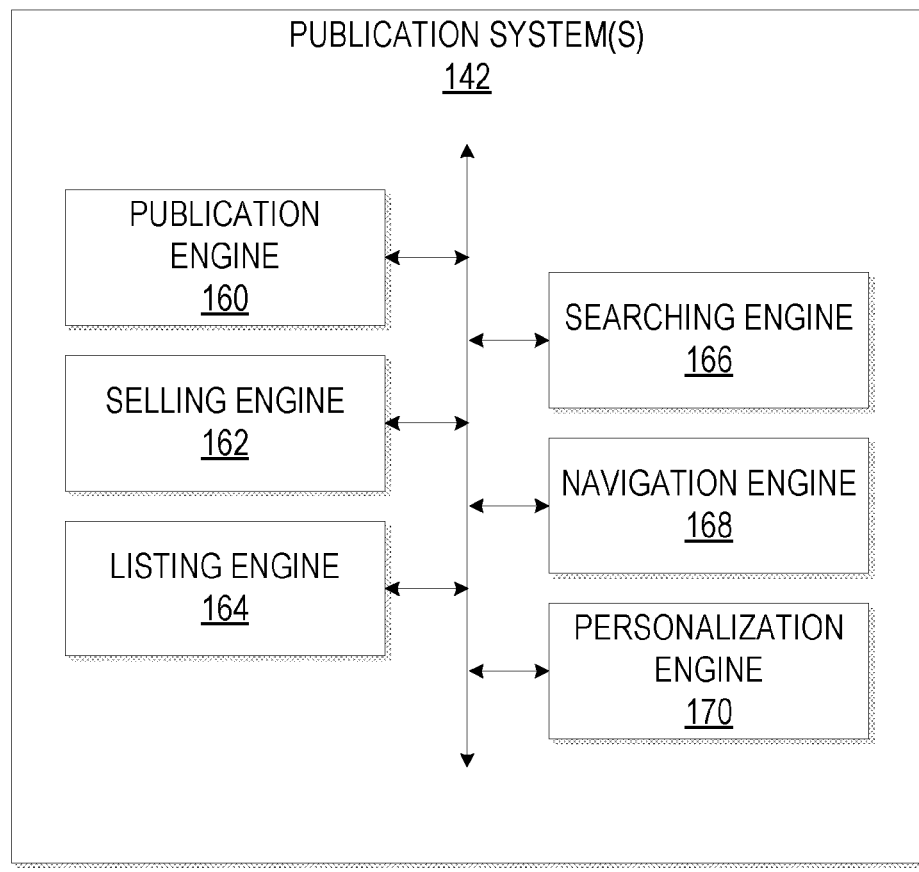
FIG. 1C illustrates a block diagram showing components provided within the system of FIG. 1B, according to some example embodiments.

FIG. 1C illustrates a block diagram showing components provided within the publication system(s) 142, according to some embodiments. In various example embodiments, the publication system(s) 142 may comprise a market place system to provide market place functionality (e.g., facilitating the purchase of items associated with item listings on an e-commerce website). In various embodiments, an authenticated session of a marketplace application (or system) may be transferred from one electronic device to another electronic device. In further embodiments, personal application data (e.g. 112*a* or 112*b*) from an authenticated session (e.g., 111*a* or 111*b*) of a marketplace application may be transferred from one electronic device (e.g., 110*a*) to another electronic device (e.g., 110*b*). The networked system 102 may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more database(s) 126 via the database server(s) 124.

The networked system 102 may provide a number of publishing, listing, and price-setting mechanisms whereby a seller also referred to as a "first user") may list or publish information concerning) goods or services for sale or barter, a buyer (also referred to as a "second user") can express interest in or indicate a desire to purchase or barter such goods or services, and a transaction (such as a trade) may be completed pertaining to the goods or services. To this end, the networked system 102 may comprise a publication engine 160 and a selling engine 162. The publication engine 160 may publish information, such as item listings or product description pages, on the networked system 102. In some embodiments, the selling engine 162 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engine 162 may further comprise one or more deal engines that support merchant-generated offers for products and services.

A listing engine 164 allows sellers to conveniently author listings of items or authors to author publications. In one embodiment, the listings pertain to goods or services that a user 106 (e.g., a seller) wishes to transact via the networked system 102. In some embodiments, the listings may be an offer, deal, coupon, or discount for the good or service. Each good or service is associated with a particular category. The listing engine 164 may receive listing data such as title, description, and aspect name/value pairs. Furthermore, each listing for a good or service may be assigned an item identifier. In other embodiments, a user 106 may create a listing that is an advertisement or other form of information publication. The listing information may then be stored to one or more storage devices coupled to the networked system 102 (e.g., database(s) 126). Listings also may comprise product description pages that display a product and information (e.g., product title, specifications, and reviews) associated with the product. In some embodiments, the product description page may include an aggregation of item listings that correspond to the product described on the product description page.

The listing engine 164 also may allow buyers to conveniently author listings or requests for items desired to be purchased. In some embodiments, the listings may pertain to goods or services that a user 106 (e.g., a buyer) wishes to transact via the networked system 102. Each good or service is associated with a particular category. The listing engine 164 may receive as much or as little listing data, such as title, description, and aspect name/value pairs, that the buyer is aware of about the requested item. In some embodiments, the listing engine 164 may parse the buyer's submitted item information and may complete incomplete portions of the listing. For example, if the buyer provides a brief description of a requested item, the listing engine 164 may parse the description, extract key terms and use those terms to make a determination of the identity of the item. Using the determined item identity, the listing engine 164 may retrieve additional item details for inclusion in the buyer item request. In some embodiments, the listing engine 164 may assign an item identifier to each listing for a good or service.

In some embodiments, the listing engine 164 allows sellers to generate offers for discounts on products or services. The listing engine 164 may receive listing data, such as the product or service being offered, a price or discount for the product or service, a time period for which the offer is valid, and so forth. In some embodiments, the listing engine 164 permits sellers to generate offers from sellers' mobile devices. The generated offers may be uploaded to the networked system 102 for storage and tracking.

Searching the networked system 102 is facilitated by a searching engine 166. For example, the searching engine 166 enables keyword queries of listings published via the networked system 102. In example embodiments, the searching engine 166 receives the keyword queries from a device of a user 106 and conducts a review of the storage device storing the listing information. The review will enable compilation of a result set of listings that may be sorted and returned to the client device 110 of the user 106. The searching engine 166 may record the query (e.g., keywords) and any subsequent user actions and behaviors (e.g., navigations, selections, or click-throughs).

The searching engine 166 also may perform a search based on a location of the user 106. A user 106 may access the searching engine 166 via a mobile device and generate a search query. Using the search query and the user 106's location, the searching engine 166 may return relevant search results for products, services, offers, auctions, and so forth to the user 106. The searching engine 166 may identify relevant search results both in a list form and graphically on a map. Selection of a graphical indicator on the map may provide additional details regarding the selected search result. In some embodiments, the user 106 may specify, as part of the search query, a radius or distance from the user 106's current location to limit search results.

In a further example, a navigation engine 168 allows users 106 to navigate through various categories, catalogs, or inventory data structures according to which listings may be classified within the networked system 102. For example, the navigation engine 168 allows a user 106 to successively navigate down a category tree comprising a hierarchy of categories (e.g., the category tree structure) until a particular set of listings is reached. Various other navigation applications within the navigation engine 168 may be provided to supplement the searching and browsing applications. The navigation engine 168 may record the various user actions (e.g., clicks) performed by the user 106 in order to navigate down the category tree.

In some example embodiments, a personalization engine 170 may allow the users 106 of the networked system 102 to personalize various aspects of their interactions with the networked system 102. For instance, the users 106 may define, provide, or otherwise communicate personalization settings that the personalization engine 170 may use to determine interactions with the networked system 102. In further example embodiments, the personalization engine 170 may automatically determine personalization settings and personalize interactions based on the automatically determined settings. For example, the personalization engine 170 may determine a native language of the user 106 and automatically present information in the native language.

Figure 2:
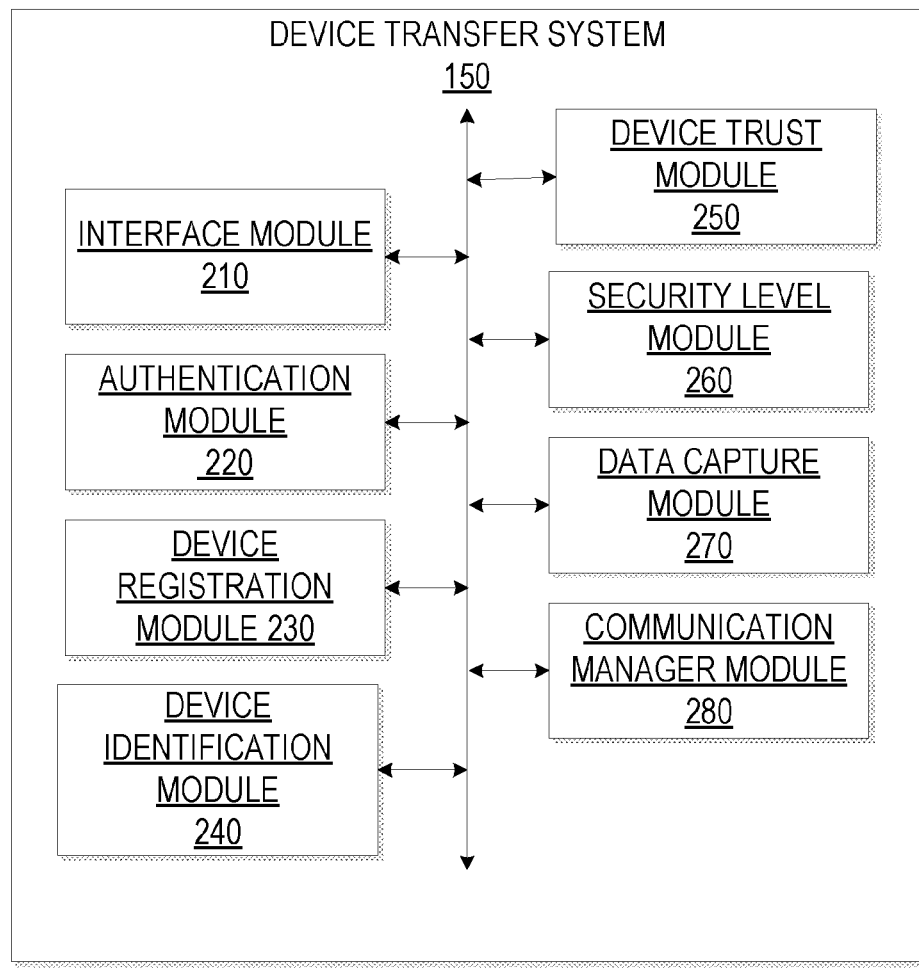
FIG. 2 is a block diagram illustrating an example embodiment of a device transfer system, according to some example embodiments.

FIG. 2 is a block diagram of the device transfer system 150, which may provide a number of functions operable to transfer an application session or 111b (or personal data from the application session 112a or 112b) from a first device 110a (associated with a user account) to a second device 110b (associated with the same or different user account), according to an example embodiment. For various embodiments, security criteria are evaluated or determined to ensure the second device 110b is a trusted device. The device transfer system 150 may be fully or partially integrated with one or more applications or systems, such as those included within the publication systems 142, the payment systems 144 or other systems, as shown in FIG. 1B. In alternative embodiments, the device transfer system 150 may be a standalone system and separate from the publication systems 142, the payment systems 144, or other systems. For example, a user 106 may be accessing, from the user 106's desktop computer, an online shopping application included within the publication system 142. The user 106 may decide to transfer the user 106's shopping application session from the user 106's desktop computer to the user 106's mobile phone. The device transfer system 150 enables the user 106 to transfer the user 106's shopping session from the user 106's desktop computer to the user 106's mobile phone without having to log into the shopping application again and to seamlessly transfer the current state, activity or user experience of the shopping session to the user 106's mobile device. The current state or activity of the shopping session may be that the user 106 is viewing a particular item (e.g., dress) on the shopping application.

In other embodiments, the device transfer system 150 may provide functionality to transfer personal application data 112a from the user session 111a on the first device 110a to the user session 111b on the second device 110b, where the first user is within a trusted group of the second user. In other embodiments, the second user is also within a trusted group of the first user. In various embodiments, the individuals within the trusted group may have varying levels of security associated with them. For example, friends may have a first level of security and family may have a second level of security. The device transfer system 150 enables the first user to seamlessly transfer the personal application data 112a from the first user's application account from a first user's device to a second user's account such that the second user may log into the second user's account on the application and view the first user's personal application data 112b on the second user's application session 111b on the second user's device.

The device transfer system 150 includes an interface module 210, an authentication module 220, a device registration module 230, a device identification module 240, a device trust module 250, a security level module 260, a data capture module 270, and a communication manager module 280. All, or a portion, of the modules 210-280 may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The interface module 210 is operable to receive various instructions from the client device(s) 110. For example embodiments, various selections or input may be received from a user 106 (via a user interface of the client device 110) to interact with an application session 111a or 111b. For example, a user 106 may provide input into the client device 110 related to device registration, security level selection, a user opt in for a known good device, authenticating a session or 111b, selecting to transfer a session 111a or 111b or personal application data 112a or 112b, to copy a session 111a or 11b, or to move a session 111a or 111b. In response to the user 106's input, the client device 110 sends instructions to the interface module 210, as needed, to transfer an application session 111a or 111b or personal application data 112a or 112b from a first device 110a to a second device 110b according to various embodiments. In another embodiment, the client device 110 sends instructions to the interface module 210, as needed, to share data, which may not be personal application data 112a or 112b, from the first device 110a associated with the first user to the second device 110b associated with the second user.

In some embodiments, the client device 110 sends instructions to the interface module 210 indicating whether the first user associated with the first device 110a would like to "copy the session" or "move the session" to the second device 110b. When the user 106 specifies to "copy the session", then once the session transfer occurs from the first device 110a to the second device 110b, an authenticated session 111a on the first device 110a remains active while an authenticated session 111b on the second device 110b remains active. For some embodiments, the authenticated session 111a and 111b copy the same state or first web page at the time of transfer, and subsequently, the authenticated sessions 111a and 111b operate as independent session. In other words, two authenticated sessions 111a and 111b of a single user 106 may be executing concurrently on the first device 110a and the second device 110b, respectively. When the user 106 specifies to "move the session", then once the session transfer occurs from the first device 110a to the second device 110b, the authenticated session 111a on the first device 110a becomes inactive (based on the session transfer) while the authenticated session 111b on the second device 110b becomes an active session. In this situation, only one authenticated session remains active, either the first device 110a (before the transfer) or the second device 110b (after the transfer).

The authentication module 220 may provide functionality to allow the user 106 to log into an application with the user 106's account to run an authenticated session. An application, such as an online shopping application, may allow the user 106 to log into the user 106's account using a user identification number user ID) and password associated with the user 106's account. In alternative embodiments, other authentication credentials may be used to log into the user 106's account. Once logged into user 106's account in the application, the user 106 may run an authenticated session 111a on the first device 110a. The authenticated session 111a may then be transferred to the second device 110b, as requested by the user 106, without having to provide authentication credentials again. In embodiments where personal application data 112a is being transferred from the first device 110a associated with the first user (who is within the trusted group of the second user), to the second device 110b associated with the second user, the first user and the second user are each log into their own accounts to authenticate the session 111a on the first device 110a and session 111b on the second device 110b, respectively. In some embodiments, a single authentication may be used for a single application, and in alternative embodiments, a single authentication may be shared with multiple applications, provided the multiple application use the same authentication system. For example, Facebook, a corporation headquartered in Menlo Park, may allow other websites running on other applications to log in using the Facebook log in credentials.

The device registration module 230 allows a user 106 to register one or more of the client devices 110 with an application such that an authenticated session of the application may be transferred to these devices, as requested by the user 106, if other security related requirements are satisfied. For example embodiments, the application may be included within the publication system 142 or the payment system 144. In some embodiments, each time the user 106 authenticates an application session with a client device 110, that particular client device 110 is added to the device list associated with that particular user 106 or user account. The registration of a device with an application may apply to a single application or multiple applications if the same authentication system is used for the multiple applications.

In an example embodiment, the device registration module 230 is configured to receive instructions to register the second device 110b with the user account for authenticated session transfers; to create a device identifier for the second device 110b; and add the device identifier to a device list associated with the user account. The device list represents the list of devices registered (or selected) by the user 106 to be associated with the user 106's account. For various embodiments, returning devices of a user 106 (or a user's account) may be included on the device list, and new devices of a user 106 (or user's account) may be added to the device list once authenticated by the user 106.

The device identification module 240 provides various functions to identify devices as being registered to a user 106 or user account, or associated with a user 106 or user account. Before an authenticated session 111a (or personal application data 112a) can be transferred from the first device 110a to the second device 110b, the device identification module 240 identifies the second device 110b to be on the device list created by the user 106. For example embodiments, these registered or associated devices are included on a device list and can be viewed by a user 106 on the client device 110 when a user 106 is logged into the application on their user account. For various embodiments, the devices registered using the device registration module 230 appears on the device list. For some embodiments, each registered client device 110 includes a device identifier (device ID), which may be a unique random number used to identify the client device 110. In example embodiments, each client device 110 that the user 106 uses to log into an application to run an authenticated session may become a registered device included in the device list associated with a user 106 or user account associated with the user 106. In other embodiments, the user 106 may take some additional action to indicate that the client device 110 running an authenticated session should be added to the device list associated with the user 106 or user account associated with the user 106. Once the device identification module 240 determines the second device 110b is on the device list, the device trust module 250 evaluates other device criteria, characteristics, or attributes associated with the second device 110b to determine with the second device 110b is a trusted device before transferring any application session 111a or personal application data 112a from the first device 110a to the second device 110b. In various embodiments, application sessions 111a or personal application data 112a are only transferred between a first device 110a and a second device 110b if the device trust module 250 determines if an authorized user is in possession of the second device 110b.

In an example embodiment, the device identification module 240 verifies the second device 110b as being associated with the user 106, or the user account, of the first device 110a. In another embodiment, the device identification module 240 determines that the second device 110b is included on a device list associated with the user account for the application.

The device trust module 250 provides functionality to evaluate or determine whether or not the second device 110b (or other client device 110) is a trusted device. In various embodiments, a client device 110 becomes a trusted device if it is determined to be a known good device (KGD). In other embodiments, device reputation may be used to determine a client device 110 is a trusted device. For example embodiments, the evaluation of the second device 110b being a trusted device is performed after the second device 110b is verified to be on the device list (or registered or associated with a particular user 106 or user account by some mechanism other than the device list). The device trust module 250 provides added account security over identifying a second device 110b as being registered to a particular user 106 or user account. Various examples of device criteria, characteristics, or attributes used to determine whether or not a client device 110 is a trusted device will be described in the paragraphs below.

In some embodiments, the device trust module 250 may determine whether or not the second device 110b is a trusted device based on transactions performed on behalf of a particular user 106. In one embodiment, good transactions performed on behalf of the user 106, or had transactions performed on behalf of the user 106 may be evaluated. A good transaction may refer to a transaction that was completed (e.g., an item purchased on a selling application) on an authenticated session 111b of an application by the user 106 using the second device 110b, and no fraudulent activity was detected. This may be considered an indication that the user 106, who is the account holder or authorized user of the account, is in possession of the second device 110b, and therefore a known good device. As more and more good transactions occur, the good reputation of the device increases, and the risk score of the second device 110b may increase. The risk score is an example metric for measuring the reputation of the second device 110b. On the other hand, a bad transaction that occurs on behalf of a particular user may indicate some sort of fraudulent activity. For example, if an unknown third party (or unauthorized user of an account) attempts to perform a transaction on someone else's account, this attempted transaction represents a bad transaction. Such a device may be added to a known bad device (KBD) list. As the good reputation of the second device 110b increases, a risk score may increase to indicate a lower risk associated with a user 106 or user account and/or client device 110.

In some embodiments, a determination that the second device 110b is a trusted device may occur automatically based on the device reputation of the second device 110b. As the good reputation increases as a result of good transactions, the second device 110 may be included in a KGD list, and automatically considered a trusted device. In other embodiments a determination that the second device 110b is a trusted device may occur manually by having a particular user 106 of the second device 110b manually provide a user 106 "opt in" to indicate the second device 110b is a trusted device. In a further embodiment, a mechanism may be provided to terminate or remove the second device 110b from being designated as being a trusted device and removed from the KGD list.

In other example embodiments, browser cookies, may be used to determine, at least in part, whether the second device 110b is a trusted device. The browser cookies represent bits of text stored on the client device 110 by the user 106's web browser. The browser cookie contains information set by web sites such as a user 106's session token, user 106's preferences, or anything else that the web site needs to keep track of a user 106 from one request to the next. Once the browser cookie is set for a web site for a particular user, the next time the user 106's browser opens a new request to the server clicking a link to a page, adding an item to the user 106's cart, or even loading an image the user 106's browser will send that cookie back to the web site that set the cookie. As a result the server is able to keep track of what request belongs to a particular user 106, and a site can determine that the web page viewed by the user 106 belongs to the user 106's account.

In alternative embodiments, a device may become a trusted device without relying on browser cookies. For example, machine learning technologies may be used to collect data, including various parameters from web browsers (e.g., web browser configuration information) to finger print a client device 110. Device finger printing refers to information collected about a remote computing device for the purpose of identification. Fingerprints can be used to fully or partially identify individual users 106 or devices even when cookies are turned off. Such information may be useful in the detection and prevention of online identity theft or other forms of fraud. As a registered device becomes more and more unique over a period of time, the backend system collects data, and does modeling on what has changed. These changes lead to the probability that the second device 110b is the same device, as the one specified by the user 106 for the transfer. The machine learning system or backend data collection systems may be included within the networked system 102 or hosted by the third party server 130.

In further embodiments, each client device 110 is associated with multiple tags, which provides different ways of tracking or figuring out whether each client device 110 is a trusted device. These tags may be referred to as trusted device tags. The browser cookie identifier (cookie ID) is an example of one of the trusted device tags. In example embodiments, once a client device 110 is on the KGD list, the tags associated with the devices 110 are always being updated. One or more tags may be used to identify a device as a trusted device. Depending on the security level required to identify a device, one or more tags may be used to identify a device as a trusted device. For example, in an advertisement scenario, it may not be required to be substantially 100% secure with respect to determining a device is a trusted device. On the other hand, in a fraud scenario, it may be required to be close to substantially 100% secure with respect to determining if a device is a trusted device. In the advertisement scenario, one tag may be sufficient for determining a trusted device with less accuracy, as compared to the fraud scenario, where more than one tag may be used to determine a trusted device with a higher level of accuracy.

In an example embodiment, one or more tags may be used to supplement the device ID, along with other information to determine the client device 110 is a KGD and therefore a trusted device. The tags associated with the client devices 110 on the KGD list may continually be updated in some embodiments.

In one embodiment, the device trust module 250 is configured to determine the second device 110b is a trusted device by identifying a device identifier of the second device 110b using cookies. In another embodiment, the device trust module 250 is configured to determine the second device 110b is a trusted device by identifying a device identifier of the second device 110b using one or more browser attributes. In a further embodiment, the device trust module 250 is configured to determine the second device 110b is a trusted device by identifying one or more device tags associated with the second device 110b. In yet a further embodiment the device trust module 250 is configured to identify one or more device tags associated with the second device 110b by identifying at least one tag from a group consisting of: cookies id.

In an example embodiment, the device trust module 250 is configured to determine the second device 110b is the trusted device of the user 106 by determining a device reputation of the second device 110b, and determining the second device 110b is the trusted device based on the device reputation. In another example embodiment, the device trust module 250 is configured to determine the device reputation of the second device 110b by determining the device reputation based on transactions of the user 106 on the second device 110b. In another embodiment, the device trust module 250 is configured to determine the device reputation of the second device 110b by accessing recorded user activity on the second device 110b, the recorded user activity represents user data tracked while the user 106 is using the application; and determining no fraudulent activity was identified from the recorded user activity.

In another example embodiment, the device trust module 250 is configured to determine the second device 110b is the trusted device of the user 106 by determining only good transactions on behalf of the user 106 have occurred on the second device 110b.

In yet another example embodiment, the device trust module 250 is configured to determine the second device 110b is the trusted device by determining the second device 110b is included on a device list associated with the user 106 for the application, and determining the second device 110b is a known good device. The device trust module 250 is further configured to automatically determine the known good device based on good transactions using the application on the second device 110b in an example embodiment.

In some embodiments, the device trust module 250 is configured to determine the second device 110b is the trusted device of the user 106 by determining a device reputation of the second device 110b, and determining the second device 110b is the trusted device based on the device reputation. The device trust module 250 is further configured to determine the device reputation based on transactions of the user 106 on the second device 110b according to one example. The device trust module 250 is further configured to determine the device reputation by accessing recorded user activity on the second device 110b where the recorded user activity represents user data tracked while the user 106 is using the application, and determining no fraudulent activity was identified from the recorded user activity according to another example.

In other embodiments, the device trust module 250 is configured to determine the second device 110b is the trusted device of the user 106 by determining only good transactions on behalf of the user 106 have occurred on the second device 110b. In another embodiment, the device trust module 250 is configured to determine the second device 110b is the trusted device of the user 106 by determining the second device 110b is included on a device list associated with the user 106 for the application, and determining the second device 110b is a known good device. The device trust module 250 is configured to determine the second device 110b is the known good device by automatically determining the known good device based on good transactions using the application on the second device 110b according to an example embodiment. The device trust module 250 is configured to determine the second device 110b is the known good device by receiving instructions indicating the user 106 has indicated the second device 110b is a known good device according to another example. The device trust module 250 is configured to determine the second device 110b is the known good device by determining the second device 110b is not included on the known bad device list in another example.

In a further embodiment, the device trust module 250 is configured to determine the second device 110b is the trusted device of the user 106 further by accessing characteristics of the second device 110b, the characteristics including device type, and determining the second device 110b is the trusted device based on the characteristics of the second device 110b. In another embodiment, the device trust module 250 is configured to determine the second device 110b is the trusted device of the user 106 based on a risk score.

The security level module 260 provides functionality to determine the security level between a single user 106 or two users 106 according to various embodiments. For example, security level 1 may be referred to as the friend security level (between two users 106); security level 2 may be referred as the family security level (between two users 106); and security level 3 may be referred to as the session security level (between a single user 106). For example embodiments, the level of security is designated by the user 106, the first user associated with the first device 110a, or the second user associated with the second device 110b, depending on the type of security level. In various embodiments, the security level module 206 provides information regarding the user-specified security level to the device trust module 250 to assist the device trust module 250 in determining the appropriate attributes, criteria or characteristics of the second device 110b to evaluate or apply when determining whether the second device 110b is a trusted device. For example, the security level 3 (being the highest level of security) may require a more accurate evaluation as to whether the second device 110b is a trusted device than the security level 2, which may require a more accurate evaluation than the security level 1 (being the lowest level of security).

The user selectable level of security is an option provided to the user 106 on the client device 110 while in an authenticated session for some embodiments. For example, the user 106 may be able to designate through the user interface of the client device 110 that one or more persons are within the user 106's trusted group of friends or trusted group of family members. Furthermore, the user 106 may be able to designate through the user interface of the client device 110 specific devices that are associated with each person within the user 106's trusted groups of family or friends, according to an example embodiment. In some embodiments, when transferring data from a first device 110a to a second device 110b, the data transferred may be transferred from an account of the first user associated with the first device 110a to the second user associated with the second device 110b. Each of the first user associated with the first device 110a and the second user associated with the second device 110b can access the data while in an authenticated session in their respective user accounts in an example embodiment. A user 106, may view the user 106's trusted group of friends, trusted group of family member, and registered devices (included devices of friends, family members and the user 106) through the user interface of the client device 110 while in an authenticated session of an application.

At the friend security level, the first user associated with a first device 110a and the second user associated with a second device 110b are within a trusted group of friends, as designated by one or both of the first user and the second user. For one embodiment, the friend security level allows the first user associated with a first device 110a to share data from the authenticated session with a second user associated with a second device 110b. At the friend security level, information or data that is shared is not unique or personal to the first user associated with the first device 110a. According to various embodiments, before information can be shared between two users 106 of two devices, the device identification module 240 identified the device as being a registered device associated with the second user associated with the second device 110b and the device trust module 250 determined that the second device 110b was a trusted device.

At the family security level, the first user associated with a first device 110a and the second user associated with the second device 110b are within a trusted group of family, as designated by one or both of the first user and the second user. At the family security level, information or data that is transferred is personal application data 112a from an authenticated session 111a of the first user associated with the first device 110a in an example embodiment. The family security level may be considered a higher security level than the friend security level and may require the device trust module 240 to apply more stringent requirements (than at the friend security level) when determining whether the device 110b is a trusted device. According to various embodiments, before personal application data 112a or 112b from an authenticated session 111a or 111b (of a user account) can be transferred between two users 106 of two devices, the device identification module 240 identified the device as being a registered device associated with the second user associated with the second device 110b, and the device trust module 250 determined that the second device 110b was a trusted device.

For example, the first user is accessing a shopping application in the first user's account from a first device 110a. In other words, the first user has an authenticated session (e.g., 111a) active on the shopping application. The first user would like to transfer personal application data 112a from the application associated with the first user to a second device 110b associated with a second user. The personal application data 112a or 112b may represent data in a shopping cart (or other item container such as a wish list, save for later list, etc.) of the first user's active shopping session. The trusted group may represent family members of the second user associated with the second device 110b, as specified by the second user. In one example, the family level of security may include a wife (who is the first user) and the husband (who is the second user). In this example, above, the wife has collected several items in the shopping cart of her active session in the shopping application using the first device 110a, and would like to transfer her shopping cart to her husband's account for him to purchase these items on the second device 110b. In this example, the shopping cart items, also referred to as personal application data (e.g. 112a or 112b) of the wife, are transferred to her husband's account where he can log into his own account on the shopping application and make the purchase of the items his wife requested.

At the session security level, the first user and the second user are the same person having multiple devices registered with an application according the various embodiments. This level of security allows a user to transfer an authenticated session 111a of a first device 110a associated with the user to a second device 110b associated with the user if it is determined the second device 110b is a registered device of the user (within the application) and a trusted device. According to various embodiments, before an authenticated session 111a of a user can be transferred from the first device 110a registered to the user to the second device 110b registered to the user, the device identification module 240 identified the device as being a registered device associated with the user, and the device trust module 250 determined that the second device 110b was a trusted device.

The data capture module 270 provides functionality to capture data in an authenticated session for various embodiments. As indicated above, the client device 110 provides user specified instructions that is received by interface module 210. The instructions received by the interface module 210 may specify whether to capture data for an entire authenticated session for a session transfer, or capture data from an authenticated session that is personal application data to the user (e.g., a shopping cart, wish list, save for later list, or other online container) for personal application data transfer. The data captured by the data capture module 270 is the data that is transferred from the first device 110a to the second device 110b according to various embodiments. In other words, the session (or personal application data from a session) on the first device 110a is duplicated on the second device 110b when transferred. More specifically, the session activity state or user experience is captured by the data capture module 270 for the transfer. In some embodiments, the activity state may include, among other things, progress within an application, current activity within an application (e.g., a level or state of a game, a stage in a workflow, a location of navigation within a document, such as a web page, a particular web page on an e-commerce site, an item being viewed on an online shopping application, shopping carts, wish list and other online containers, etc.)

The communication manager module 280 may provide various communications functionality for the device transfer system 150. For example, network communication such as communicating with networked system 102, the database servers 124, the third party servers 130, and the client devices 110 may be provided. In various example embodiments, network communication may opera e over any wired or wireless means to provide communication functionality. Web services are intended to include retrieving information from the third party servers 130 and the application servers 118. Information retrieved by the communication manager module 280 comprises data associated with the user 106 (e.g., user profile information from an online account, social networking data associated with the user 106), application data 127b associated with an application session, data security information (including device identification data and device reputation data, and other data In an example embodiment, the application session data or personal application data transferred from the first device 110a to the second device 110b may be transferred from the first device 110a to the second device 110b, and in alternative embodiment, the application session data or personal application data may be transferred from the first device 110a to the second device 110b through the networked system 102. In some embodiments, the communication between the first device 110a and the second device 110b may use various types of short range communications protocols, such as BlueTooth Low Energy (BLE) protocols or near field communication (NFC) protocols using radio communications over short distances. In further embodiment, the session transfers may be initiated by various mechanisms, for example, smartphone gestures, flicks, shakes, voice commands, etc.

In an example embodiment, a system includes processor-implemented modules comprising: the interface module 210 is configured to receive an instruction to transfer an authenticated session 111a of an application running on the first device 110a associated with a user account to the second device 110b associated with the user account; the device identification module 240 is configured to verify the second device 110b is associated with the user account of the first device 110a; the device trust module 250 is configured to deter the second device 110b is a trusted device of an authorized user of the user account; and the communication manager module 280 is configured to transfer the authenticated session of the application running on the first device 110a to the second device 110b to reproduce a current state of the authenticated session 111a. The interface module 210, the device identification module 240, the device trust module 250 and the communication manager module 180 are processor-implemented modules of a system.

In another example embodiment, a system includes processor-implemented modules comprising: the interface module 210 is configured to receive an instruction to transfer personal application data from the authenticated session 111a of an application running on the first device 110a associated with a first user having a first user account to the second device 110b associated with a second user having a second user account; the device identification module 240 is configured to verify that the first user having the first user account is within a trusted group of the second user having the second user account, and verify the first device 110a is associated with the second device 110b; the device trust module 250 is configured to identify from the application the first device 110a is a trusted device based on a device reputation of the first device 110a; and the communication manager module 280 is configured to transfer the personal application data 112a from the authenticated session 111a of the application running on the first device 110a to the second device 110b to reproduce the personal application data 112b from the authenticated session 111a of the first user on the first device 110a to the authenticated session 111b of the second user on the second device 110b. The interface module 210, the device identification module 240, the device trust module 250 and the communication manager module 180 are processor-implemented modules of a system.

In a further embodiment, a system includes processor-implemented modules comprising: the interface module 210 configured to receive an instruction to transfer the authenticated session 111a of an application running on the first device 110a associated with a user account to the second device 110b associated with the user account; the device identification module 240 configured to verify the second device 110b is associated with the user account of the first device 110a; the device trust module 250 configured to determine the second device 110b is a trusted device of an authorized user of the user account based on good transactions on behalf of the user on the second device 110b; and the communication manager module 280 configured to transfer the authenticated session 111a of the application running on the first device 110a to the second device 110b to reproduce a current state of the authenticated session 111a. The interface module 210, the device identification module 240, the device trust module 250 and the communication manager module 280 are processor-implemented modules of a system.

Figure 3:
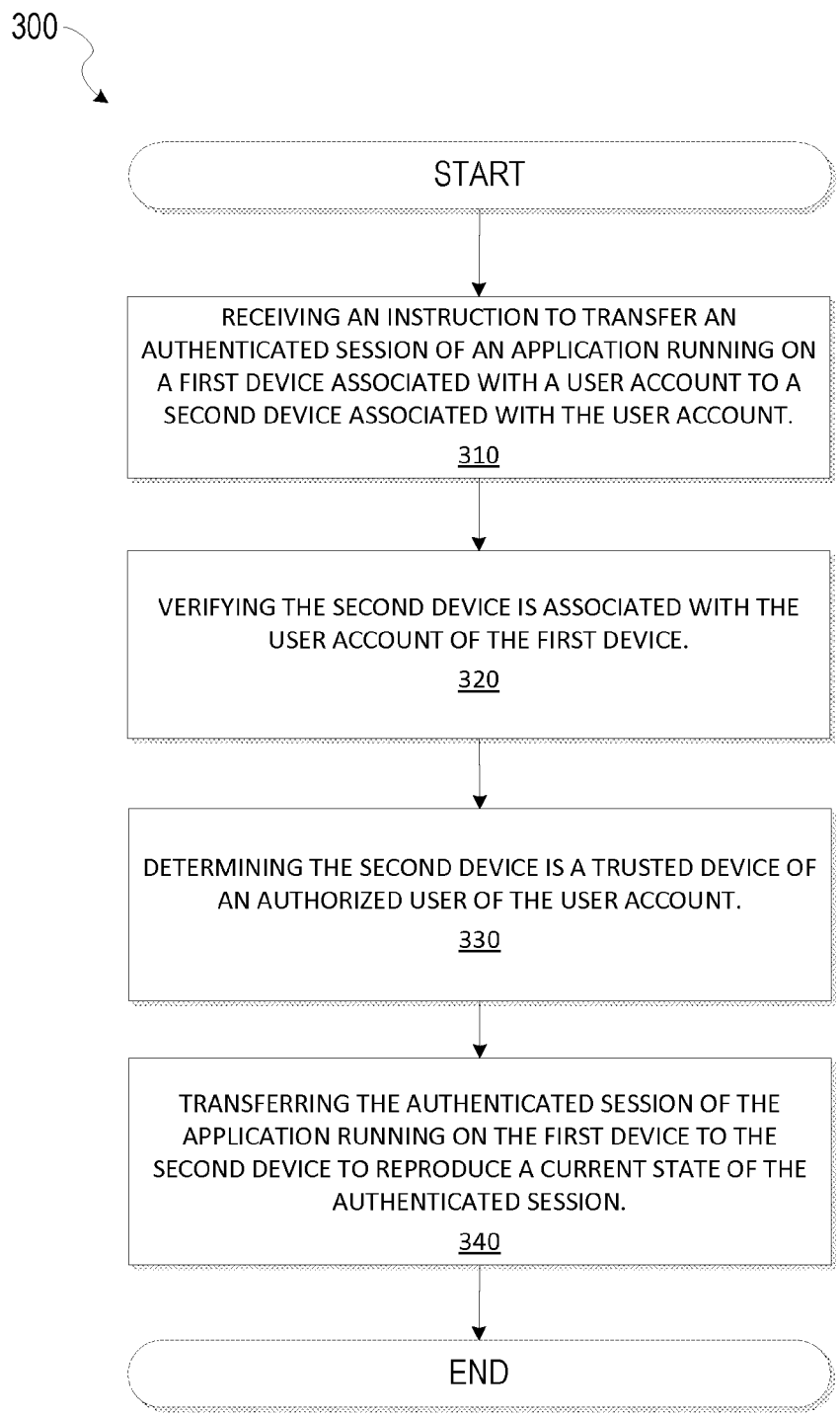
FIG. 3 is a flow diagram illustrating an example method for transferring an application session from one device to another device.
Figure 4:
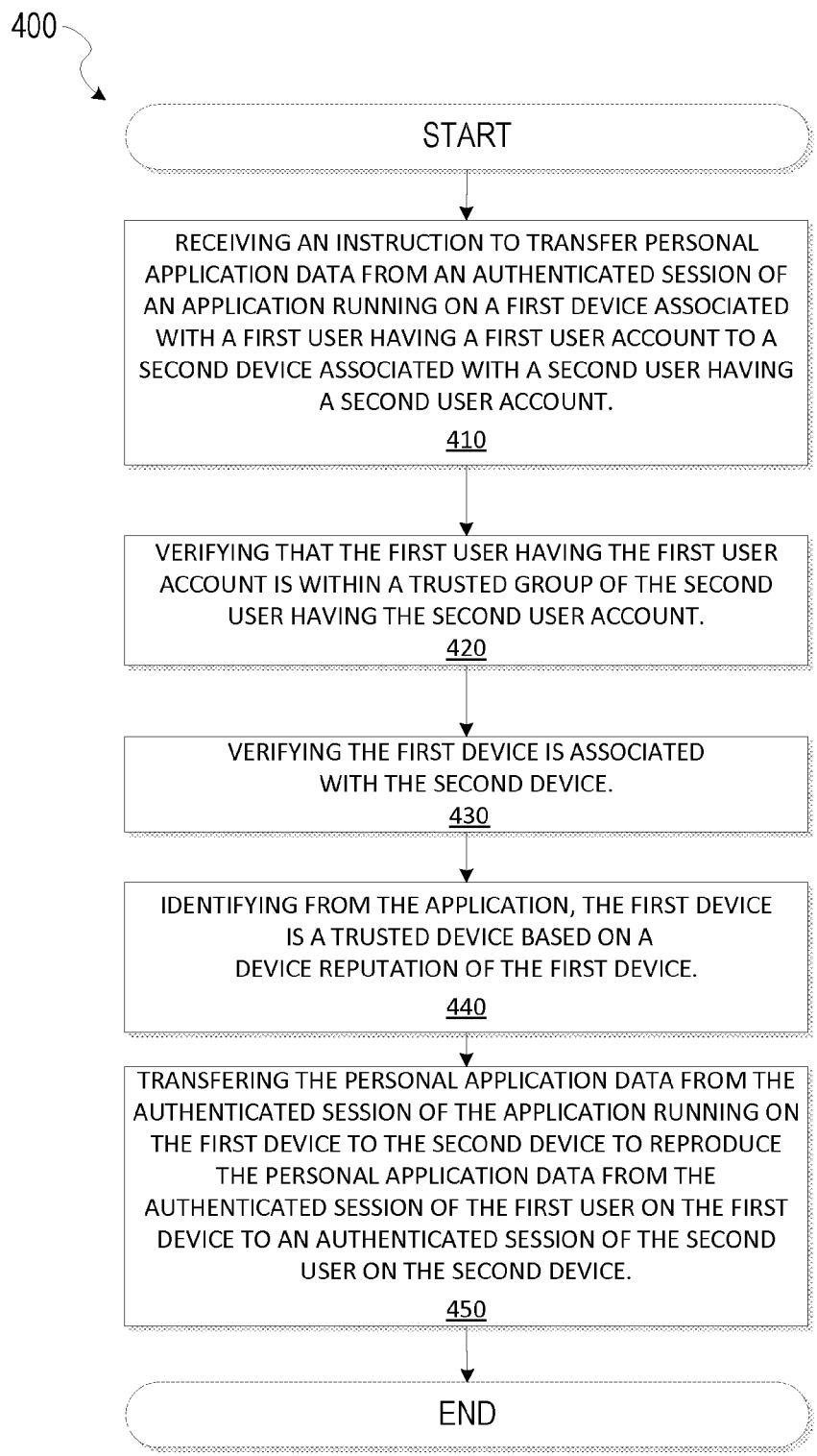
FIG. 4 is a flow diagram illustrating an example method for transferring personal application data from a session from one device to another device.
Figure 5:
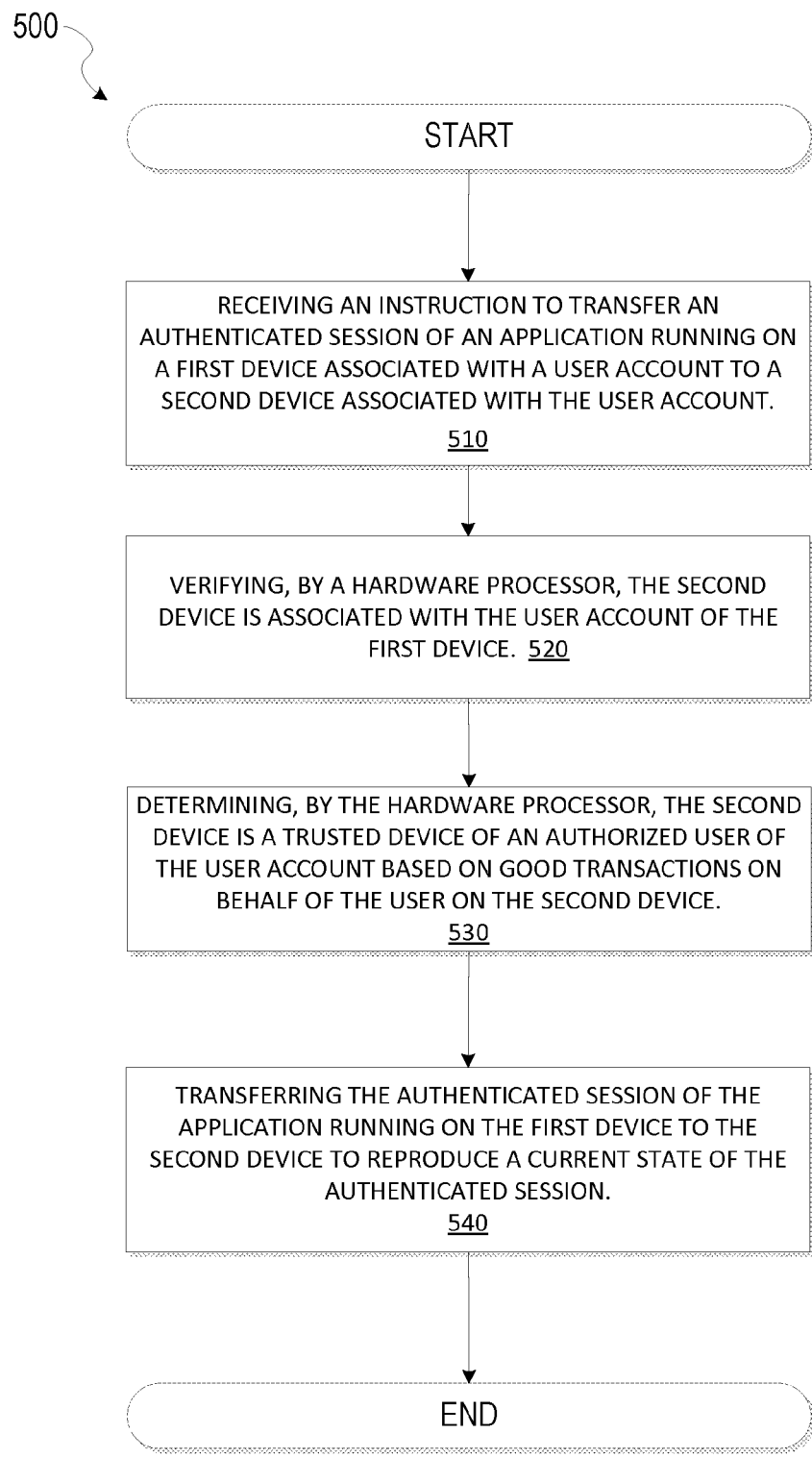
FIG. 5 is a flow diagram illustrating another example method for transferring an application session from one device to another device.

FIGS. 3-5 illustrate flow diagrams for various embodiments to transfer an authenticated session or personal application data from an authenticated session from one electronic device to another electronic device. In an example embodiment, the flow diagram of methods 300-500 may be implemented using one or more modules of the device transfer system 150 (shown in FIG. 2). In alternative embodiments, additional operations may be added to each of the methods 300-500, or one or more operations may be deleted from each of the methods 300-500. In further embodiments, the operation of methods 300-500, or variants of these flow diagrams, may be combined.

FIG. 3 is a flow diagram illustrating a method 300 for transferring an authenticated session from one electronic device to another electronic device according to one embodiment. At operation 310, an instruction is received to transfer an authenticated session of an application running on the first device 110a associated with a user account to the second device 110b associated with the user account. In one embodiment, the interface module 210 performs the operation 310. At operation 320, the second device 110b is verified to be associated with the user account of the first device 110a. In an example embodiment, the device identification module 240 performs the operation 320. At operation 330, the second device 110b is determined to be a trusted device of an authorized user of the user account. In another example embodiment, the device trust module 250 performs the operation 330. At operation 340, the authenticated session 111a of the application running on the first device 110a is transferred to the second device 110b to reproduce a current state of the authenticated session 111a with session 111b. In one embodiment, the communication manager module 280 performs the operation 340.

In further embodiments, the method of 300 includes the operations of: receiving instructions to register the second device 110b with the user account for authenticated session transfers; creating a device identifier for the second device 110b; and adding the device identifier to a device list associated with the user account. In additional embodiments, the method 300 includes determining the second device 110b is a trusted device of the user by identifying a device identifier of the second device 110b using cookies. In other embodiments, the method of 300 includes determining the second device 110b is a trusted device of the user 106 by identifying a device identifier of the second device 110b using one or more browser attributes. In yet another embodiment, the method of 300 includes determining the second device 110b is a trusted device of the user 106 by identifying one or more device tags associated with the second device 110b. In further embodiments, the method of 300 includes identifying one or more device tags associated with the second device 110b by identifying at least one tag from a group consisting of: cookies id.

In some embodiments, the method 300 further includes receiving instructions to authenticate the session 111a of the application running on the first device 110a based on a user id and password. In other embodiments, the method of 300 includes verifying the second device 110b as being associated with the user 106 of the first device 110a by determining the second device 110b is included on a device list associated with the user account for the application. In yet a further embodiment, the method of 300 includes determining the second device 110b is the trusted device of the user by determining a device reputation of the second device 110b, and determining the second device 110b is the trusted device based on the device reputation. In additional embodiments, the method 300 includes determining the device reputation of the second device 110b further by determining the device reputation based on transactions on behalf of the user on the second device 110b. In yet other embodiments, the method 300 includes determining the device reputation of the second device 110b by accessing recorded user activity on the second device 110b, the recorded user activity representing user data tracked while the user is on an active session 111b of the application and by determining no fraudulent activity was identified from the recorded user activity.

In other example embodiments, the method of 300 includes determining the second device 110b is the trusted device of the user 106 further by determining only good transactions on behalf of the user 106 have occurred on the second device 110b. In other various embodiments, the method 300 includes determining the second device 110b is the trusted device of the user by determining the second device 110b is included on a device list associated with the user account for the application and determining the second device 110b is a known good device. In another embodiment, the method 300 includes determining the second device 110b is the known good device by automatically determining the known good device based on good transactions using the application on the second device 110b. In additional embodiments, the method 300 includes determining the second device 110b is the known good device by receiving instructions indicating the user has indicated the second device 110b is a known good device. In further embodiments, the method 300 includes determining the second device 110b is the known good device by determining the second device 110b is not included on the known had device list.

In various other embodiments, the method 300 include determining the second device 110b is the trusted device of the user 106 by accessing characteristics of the second device 110b, and determining the second device 110b is the trusted device based on the characteristics of the second device 110b. In another embodiment, the method 300 includes determining the second device 110b is the trusted device of the user 106 by determining the second device 110b is the trusted device of the user 106 based on a risk score. In further embodiment, the method 300 includes transferring the authenticated session 111a of the application running on the first device 110a to the second device 110b by activating the authenticated session 111b on the second device 110b and deactivating the authenticated session Ma on the first device 110a. In another embodiment, the method 300 includes transferring the authenticated session 111a of the application running on the first device 110a to the second device 110b by activating the authenticated session 111b on the second device 110b to copy the authenticated session 111a onto the second device 110b, and continuing to keep the authenticated session 111a active on the first device 110a. In further embodiments, the method 300 includes transferring the authenticated session 111a of the application running on the first device 110a to the second device 110b by transferring a state of the authenticated session 111a of the application running on the first device 110a at a designated security level to the second device 110b, wherein the first device 110a is associated with a first user and the second device 110b is associated with a second user.

FIG. 4 is a flow diagram illustrating a method 400 for transferring personal application data from an authenticated session from one electronic device to another electronic device according to an example embodiment. At operation 410, an instruction is received to transfer personal application data 112a from an authenticated session 111a of an application running on a first device 110a associated with the first user having the first user account to the second device 110b associated with the second user having the second user account. At operation 420, the first user having the first user account is within a trusted group of the second user having the second user account is verified. At operation 430, that the first device 110a is associated with the second device 110b is verified. At operation 440, the first device 110a is identified as being a trusted device based on a device reputation of the first device 110a. At operation 450, the personal application data 112a is transferred from the authenticated session 111a of the application running on the first device 110a to the second device 110b to reproduce the personal application data 112a from the authenticated session 111a of the first user on the first device 110a to an authenticated session 111b of the second user on the second device 110b.

FIG. 5 is a flow diagram illustrating a method 500 for transferring an authenticated session from one electronic device to another electronic device according to another embodiment. At operation 510, an instruction is received to transfer an authenticated session 111a of an application running on the first device 110a associated with a user account to the second device 110b associated with the user account. At operation 520, the second device 110b is verified to be associated with the user account of the first device 110a. At operation 530, the second device 110b is determined to be a trusted device of an authorized user of the user account based on good transactions on behalf of the user on the second device 110b. At operation 540, the authenticated session 111a of the application running on the first device 110a is transferred to the second device 110b to reproduce a current state of the authenticated session 111a. The authenticated session 111b represents the current state of the authenticated session 111a.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor, or other programmable processor will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

Figure 6:
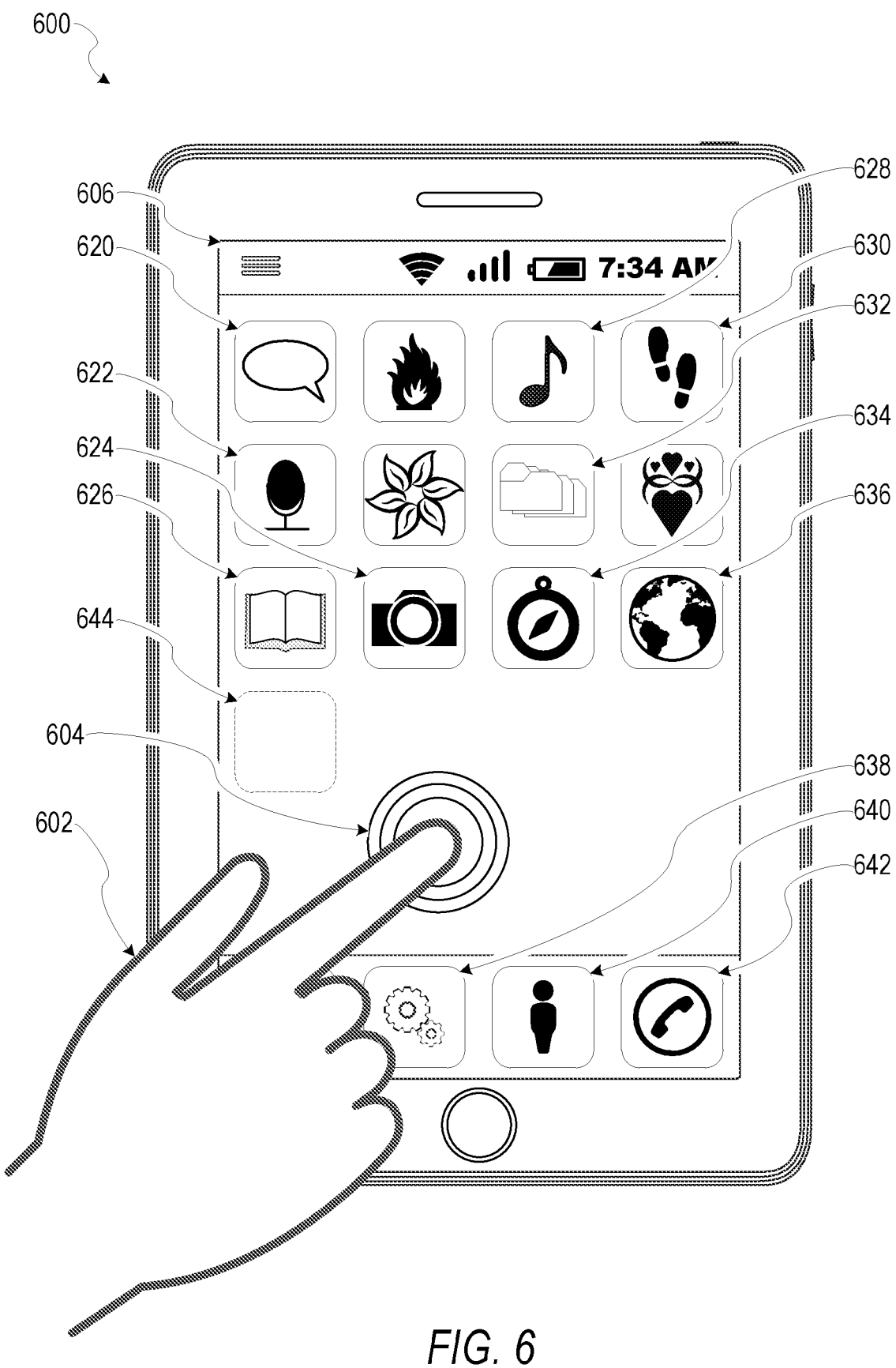
FIG. 6 depicts an example mobile device and mobile operating system interface, according to some example embodiments.

FIG. 6 illustrates an example mobile device 600 that may be executing a mobile operating system (e.g., iOS™, Android™, Windows® Phone, or other mobile operating systems), according to example embodiments. In one embodiment, the mobile device 600 may include a touch screen that may receive tactile information from a user 602. For instance, the user 602 may physically touch 604 the mobile device 600, and in response to the touch 604, the mobile device 600 may determine tactile information such as touch location, touch force, gesture motion, and so forth. In various example embodiments, the mobile device 600 may display home screen 606 (e.g., Springboard on iOS™) that the user 602 of the mobile device 600 may use to launch applications and otherwise manage the mobile device 600. In various example embodiments, the home screen 606 may provide status information such as battery life, connectivity, or other hardware status. The home screen 606 may also include a plurality of icons that may be activated to launch applications, for example, by touching 604 the area occupied by the icon. Similarly, other user interface elements may be activated by touching 604 an area occupied by a particular user interface element. In this manner, the user 602 may interact with the applications.

Many varieties of applications (also referred to as "apps") may be executing on the mobile device 600. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 600 may include a messaging app 620, audio recording app 622, a camera app 624, a book reader app 626, a media app 628, a fitness app 630, a file management app 632, a location app 634, a browser app 636, a settings app 638, a contacts app 640, a telephone call app 642, other apps (e.g., gaming apps, social networking apps, biometric monitoring apps), a third party app 644, and so forth.

Software Architecture

Figure 7:
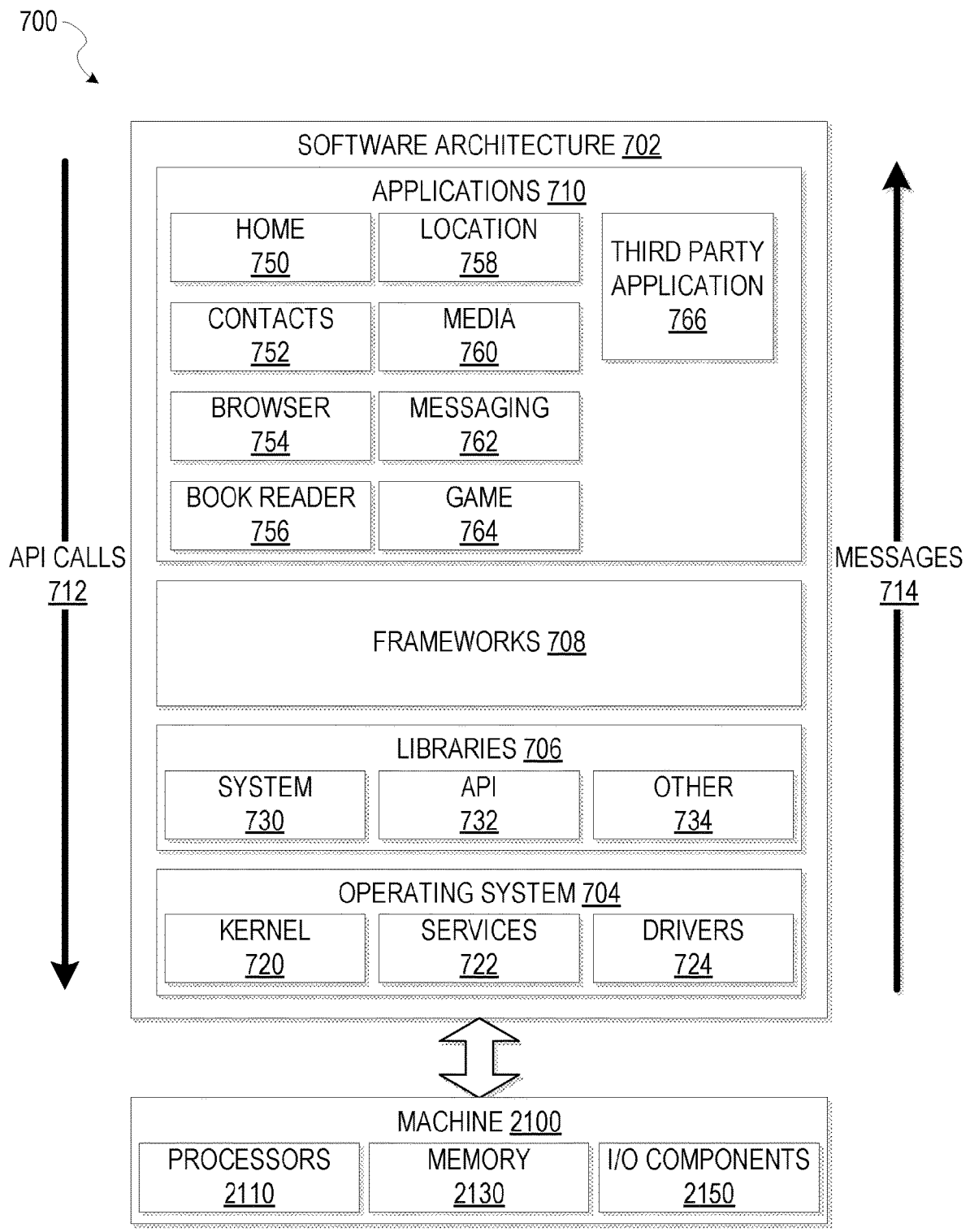
FIG. 7 is a block diagram illustrating an example of a software architecture that may be installed on a machine, according to some example embodiments.

FIG. 7 is a block diagram 700 illustrating an architecture of software 702, which may be installed on any one or more of devices described above. FIG. 7 is merely a non-limiting example of a software architecture and it will be appreciated that many other architectures may be implemented to facilitate the functionality described herein. The software 702 may be executing on hardware such as machine 800 of FIG. 8 that includes processors 810, memory 830, and I/O components 850. In the example architecture of FIG. 7, the software 702 may be conceptualized as a stack of layers where each layer may provide particular functionality. For example, the software 702 may include layers such as an operating system 704, libraries 706, frameworks 708, and applications 710. Operationally, the applications 710 may invoke application programming interface (API) calls 712 through the software stack and receive messages 714 in response to the API calls 712.

The operating system 704 may manage hardware resources and provide common services. The operating system 704 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 706 may provide a tow-level common infrastructure that may be utilized by the applications 710. The libraries 706 may include system 730 libraries (e.g., C standard library) that may provide functions such as memory allocation functions, string manipulation functions, mathematic functions, and the like. In addition, the libraries 706 may include API libraries 732 such as media libraries (e.g., libraries 706 to support presentation and manipulation of various media format such as MPREG4, H.264, MP3, AAC, AMR, JPG,), graphics libraries (e.g., an OpenGL framework that may be used to render 2D and 3D in a graphic content on a display), database libraries (e.g., SQLite that May provide various relational database functions), web libraries (e.g., WebKit that may provide web browsing functionality), and the like. The libraries 706 may also include a wide variety of other libraries 734 to provide many other APIs to the applications 710.

The frameworks 708 may provide a high-level common infrastructure that may be utilized by the applications 710. For example, the frameworks 708 may provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

The applications 710 include a home application 750, a contacts application 752, a browser application 754, a book reader application 756, a location application 758, a media application 760, a messaging application 762, a game application 764, and a broad assortment of other applications 710 such as third party application 766. In a specific example, the third party application 766 (e.g., an application developed using the Android™ or iOS™ software development kit (SDK) by an entity other than the vendor of the particular platform) may be mobile software running on a mobile operating system 704 such as iOS™, Android™, Windows® Phone, or other mobile operating systems. In this example, the third party application 766 may invoke the API calls 712 provided by the mobile operating system 704 to facilitate functionality described herein.

Example Machine Architecture and Machine-Readable Medium

Figure 8:
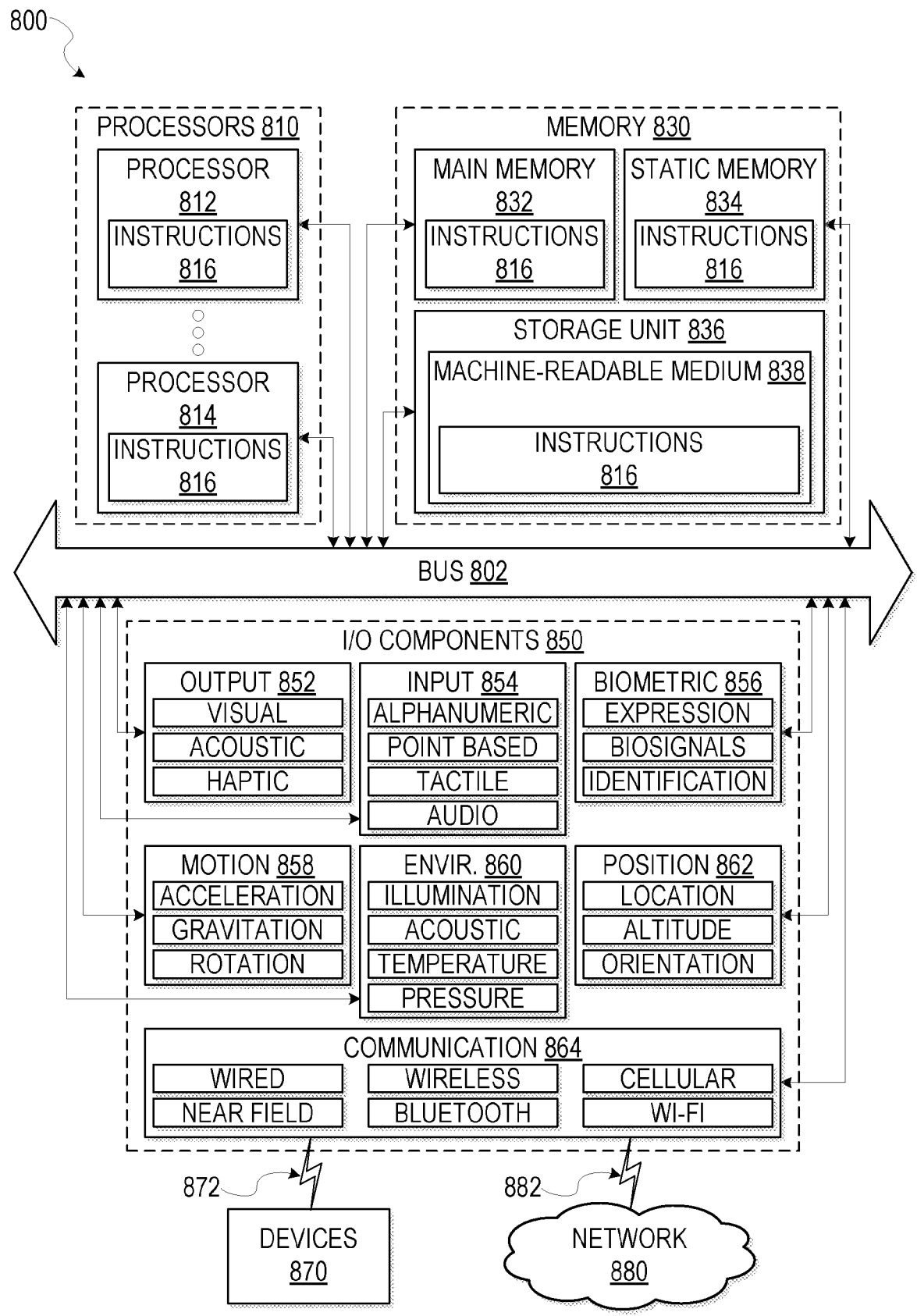
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 600, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 812 and processor 814 that may execute instructions 816. The term "processor" is intended to include multi-core processor that may comprise two or more independent processors (also referred to as "cores") that may execute instructions 816 contemporaneously. Although FIG. 8 shows multiple processors 810, the machine 800 may include a single processor 810 with a single core, a single processor 810 with multiple cores (e.g., a multi-core process, multiple processors 810 with a single core, multiple processors 810 with multiples cores, or any combination thereof.

The memory 830 may include a main memory 832, a static memory 834, and a storage unit 836 accessible to the processors 810 via the bus 802. The storage unit 836 may include a machine-readable medium 838 on which is stored the instructions 816 embodying any one or more of the methodologies or functions described herein. The instructions 816 may also reside, completely or at least partially, within the main memory 832, within the static memory 834, within at least one of the processors 810 (e.g., within the processor's cache memory), or any suitable combination thereof, during execution thereof by the machine 800. Accordingly, the main memory 832, static memory 834, and the processors 810 may be considered as machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown in an example embodiment to be a single medium, the term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 may include a wide variety of components to receive input, provide output, produce output, transmit information, exchange information, capture measurements, and so on. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a. Global Position System (GPS) receiver component), attitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, near field communication (NEC) components, Bluetooth® components (e.g., Bluetooth® Low Energy), Wi-Fi® components, and other communication components 864 to provide communication via other modalities. The devices 870 may be another machine 800 or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NEC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LYE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Furthermore, the machine-readable medium 838 is non-transitory (in other words, not having any transitory signals) in that it does not embody a propagating signal. However, labeling the machine-readable medium 838 as "non-transitory" should not be construed to mean that the medium is incapable of movement; the medium should be considered as being transportable from one physical location to another. Additionally, since the machine-readable medium 838 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating application data within a first authenticated session established via a first account of a first user on a first application running on a first device, wherein the application data identifies one or more items in a first online shopping container of the first application;
    receiving, by one or more hardware processors, an instruction from the first device to transfer the application data from the first authenticated session to a second authenticated session established via a second user account of a second user on a second application running on a second device;
    verifying the second user account is permitted to receive a transfer of the application data from the first user account by determining the second user account is included on a list associated with the first user account and determining the second device is a trusted device based on a device reputation determined for the second device, wherein the device reputation of the second device is determined by identifying the second device is included on a device list associated with the first user account; and
    transferring, by the one or more hardware processors, the application data from the first authenticated session to the second authenticated session by copying the one or more items in the first online shopping container of the first application to a second online shopping container of the second application, the first online shopping container remaining active on the first device with the one or more items after copying the one or more items to the second online shopping container.

2. The method of claim 1, further comprising:
    receiving, by the one or more hardware processors, instructions to register the second device with the first user account for authenticated session transfers;
    creating a device identifier for the second device; and
    adding the device identifier to the device list associated with the first user account.

3. The method of claim 1, wherein the device reputation of the second device is based on transactions performed on the second device.

4. The method of claim 1, wherein the device reputation of the second device is further determined by:
    accessing recorded user activity on the second device, the recorded user activity representing user data tracked while the second user is on an active session of the second application; and
    determining no fraudulent activity was identified from the recorded user activity.

5. The method of claim 1, wherein the device reputation of the second device is further determined by:
    determining only good transactions on behalf of the first user have occurred on the second device.

6. The method of claim 1, wherein the device reputation of the second device is further determined by:
    determining the second device is a known good device based on the second device being included on the device list.

7. The method of claim 6, wherein determining the second device is the known good device further comprises:
    automatically determining the known good device based on good transactions using the second application on the second device.

8. The method of claim 6, wherein determining the second device is the known good device further comprises:
    receiving instructions indicating the first user has indicated the second device is a known good device.

9. The method of claim 6, wherein determining the second device is the known good device further comprises:
    determining the second device is not included on a known bad device list.

10. The method of claim 1, wherein determining the second device is the trusted device further comprises:
    accessing characteristics of the second device, the characteristics including a device type; and
    determining the second device is the trusted device based in part on the characteristics of the second device.

11. The method of claim 1, wherein determining the second device is the trusted device further comprises:
determining the second device is the trusted device based in part on a risk score.

12. A non-transitory machine readable medium storing instructions that, when executed by at least one processor of a machine, cause the machine to perform operations comprising:
generating application data within a first authenticated session established via a first account on a first application running on a first device, wherein the application data identifies one or more items in a first online shopping container of the first application;
receiving an instruction from the first device to transfer the application data from the first authenticated session to a second authenticated session established via a second user account on a second application running on a second device
verifying the second user account is permitted to receive a transfer of the application data from the first user account by determining the second user account is included on a list associated with the first user account and determining the second device is a trusted device based on a device reputation determined for the second device, wherein the device reputation of the second device is determined by identifying the second device is included on a device list associated with the first user account; and
transferring the application data from the first authenticated session to the second authenticated session by copying the one or more items in the first online shopping container of the first application to a second online shopping container of the second application, the first online shopping container remaining active on the first device with the one or more items after copying the one or more items to the second online shopping container.

13. The method of claim 1, wherein the application data further represents items in a wish list.

14. The non-transitory machine readable medium of claim 12, wherein the device reputation of the second device is further determined by:
determining the second device is a known good device.

15. The non-transitory machine readable medium of claim 14, wherein determining the second device is the known good device further comprises receiving instructions indicating the first user has indicated the second device is a known good device.

16. A system comprising:
one or more hardware processors and
a storage device storing instructions that, when executed by the one or more hardware processors, causes the one or more hardware processors to perform operations comprising:
generating application data within a first authenticated session established via a first account on a first application running on a first device, wherein the application data identifies one or more items in a first online shopping container of the first application;
receiving, by one or more hardware processors, an instruction from the first device to transfer the application data from the first authenticated session to a second authenticated session established via a second user account on a second application running on a second device
verifying the second user account is permitted to receive a transfer of the application data from the first user account by determining the second user account is included on a list associated with the first user account and determining the second device is a trusted device based on a device reputation determined for the second device, wherein the device reputation of the second device is determined by identifying the second device is included on a device list associated with the first user account; and
transferring, by the one or more hardware processors, the application data from the first authenticated session to the second authenticated session by copying the one or more items in the first online shopping container of the first application to a second online shopping container of the second application, the first online shopping container remaining active on the first device with the one or more items after copying the one or more items to the second online shopping container.

* * * * *